United States Patent [19]

Ecklund

[11] Patent Number: 4,864,772
[45] Date of Patent: Sep. 12, 1989

[54] SELF CENTERING GATE

[76] Inventor: Gary P. Ecklund, Box 812, Broadview, Saskatchewan, Canada, S0G 0K0

[21] Appl. No.: 259,139

[22] Filed: Oct. 18, 1988

[30] Foreign Application Priority Data

Dec. 23, 1987 [CA] Canada .................................. 555254

[51] Int. Cl.$^4$ ............................................... E06B 9/52
[52] U.S. Cl. .......................................... 49/59; 49/386
[58] Field of Search ...................... 49/58, 59, 60, 386, 49/364, 274, 299, 300, 289-292, 279, 282; 248/417

[56] References Cited

U.S. PATENT DOCUMENTS 1,249,928 12/1917 Durst ..................................... 49/396
2,711,037 6/1955 Tallman .
2,731,744 1/1956 Schnell .
2,849,811 9/1958 Price ..................................... 49/386
2,893,142 7/1959 Logan .
3,293,800 12/1966 Martinmaas .

OTHER PUBLICATIONS

Grainews, Jan. 1987–"Drive-through Gate Keeps Cattle In", Gary Ecklund–p. 95.

Primary Examiner—Kenneth J. Dorner
Assistant Examiner—Gerald A. Anderson
Attorney, Agent, or Firm—Adrian D. Battison; Stanley G. Ade; Murray Thrift

[57] ABSTRACT

A self-centering stock-proof gate comprises an elongate tubular member and an extension piece slideable within the tube, the extension piece carrying an embedded wire for communicating electric shock along the tubular member and along the extension piece. The tubular member is pivotally mounted about a vertical access on a hinge structure and is held in a central closed position by a pair of chain couplings which connect to a single spring lying along the tubular member and coupled thereto. Each of the chain couplings has an end link freely slideable along a pin which extends outwardly to a respective side of the tubular member from the hinge structure. Thus when the gate gets beyond a predetermined open angle, the chain slides along the pin towards the hinge structure thus reducing the mechanical advantage of the spring.

9 Claims, 2 Drawing Sheets

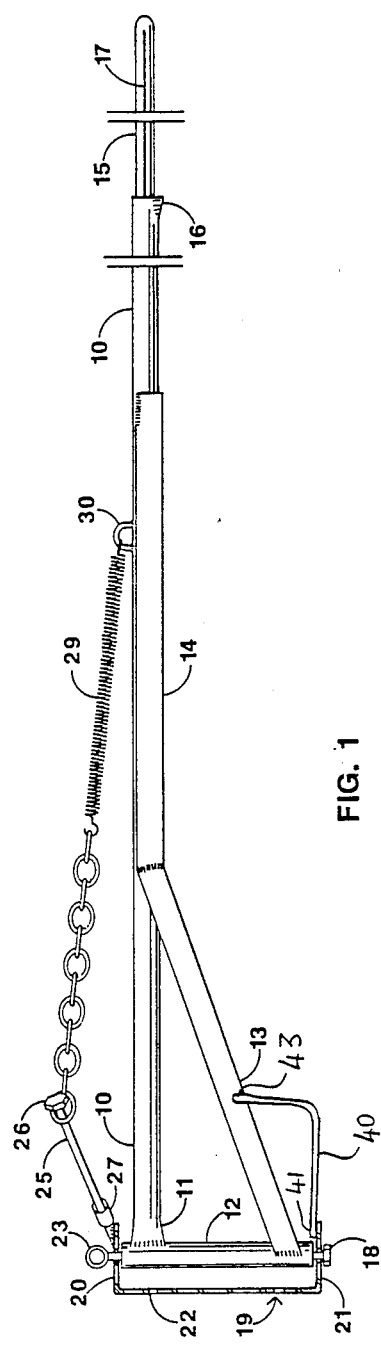
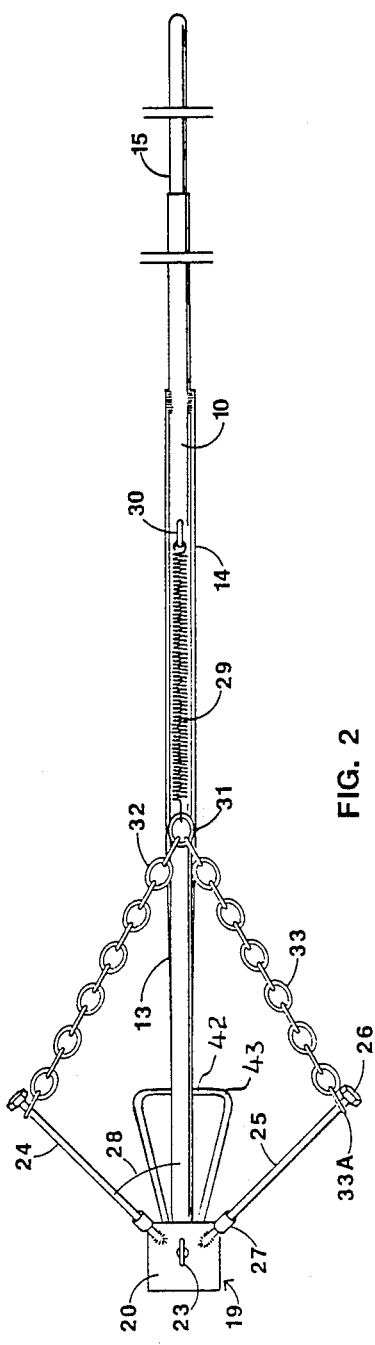

SELF CENTERING GATE

BACKGROUND OF THE INVENTION

This invention relates to a self-centering gate of the type which includes spring biasing means for biasing the gate to a central closed position from open positions on either side of the closed position.

Spring mounted gates fo this type are well known and are used particularly for retaining livestock within an area while allowing vehicles to move in and out of the area without halting to open and close the gate. Thus the gate can freely pivot open from its normal closed position merely by engaging the vehicle so the vehicle pushes the gate open and then the gate springs closed as the vehicle passes through.

In many cases gates of this type comprise an elongate bar which is electrified so that it can be a relatively lightweight structure and yet use the electric shock system to retain the animals within the restricted area.

One problem which arises with spring mounted devices of this type is that the amount of biasing force increases as the gate is pivoted from the closed position toward a fully open position so that by the time it reaches the fully open position there is significant force against the vehicle which can cause scratching or other damage. If of course the spring force is reduced so that at the open position it is an acceptable force then the spring force around the closed position is very weak and does not properly hold the gate in the closed position. A yet further problem which can arise in devices of this type is that it is desirable that they be extendable to cover various different lengths of open area and yet communicate the electric shock system along the full length of the gate.

According to the first aspect of the invention, therefore, is provided a self-centering stock-proof gate comprising a gate structure for extending across an area to be gated, a support structure including hinge means for supporting the gate structure for pivotal movement about a vertical axis at one side of the area such that the gate structure is movable from a closed position extending across a set area to each of two open positions each substantially at right angles to the closed positions, first and second spring coupling means each for biasing said gate structure from a respective one of said open positions to said closed position and means coupling said spring coupling means from said gate structure to said suport structure and including first and second slide coupling means each mounted on said support structure so as to extend the front said axis forwardly and outwardly to a respective side of said axis, each said slide coupling means being arranged to receive an end of said respective spring coupling means for movement of said end from a position outwardly of said axis to position adjacent to said axis, the orientation of the slide coupling means and the connection between the spring coupling means from the slide coupling means to the gate structure being arranged such that in the closed position said ends slides to said outward position and as said gate moves toward a respective one of the open positions, the end slides toward said adjacent position.

According to the second aspect of the invention is provided a self-centering stock proof gate comprising a gate structure for extending across an area to be gated, a support structuring including hinge means for supporting the gate structure for pivotal movement about a vertical axis at one side of the area such that the gate structure is movable from a closed position extending across to the area to each of two open positions each substantially right angles to the closed angles, first and second spring coupling means for biasing said gate structure from a respective one of said open positions to said closed position, said gate structure comprising an elongate tube member extending substantially horizontally from said hinge means to an open end of said tube member remote from said hinge means and an extension piece mounted within said tube member and slideable therein from a position in which it is substantially wholly retracted therein to an extended position therefrom, said extension piece comprising a fibre reinforced plastic rod having an electrically conductive wire embedded in the surface thereof.

It is one advantage of the invention, therefore, that the spring force is reduced as the gate moves to the open position by the slide coupling which allows the pull on the gate to be moved from a position outwardly of the axis to a position closer to the axis so that the mechanical advantage of the spring reduces while the linear force increases.

Preferably, each of the slide coupling comprises a pin which extends outwardly from the support structure with the pin also extending slightly upwardly while extending forwardly and outwardly to the side. This ensures that the connecting chain extending from the pin to the gate as it slides downwardly along the pin in the open position of the gate passes underneath the other of the pins while the chain to that other pin merely becomes loose.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is side elevational view of a self-centering gate according to the invention.

FIG. 2 is top plan view of the gate of FIG. 1.

In the drawings like characters of reference indicate corresponding parts in the different FIGS.

DETAILED DESCRIPTION

Figure 3:
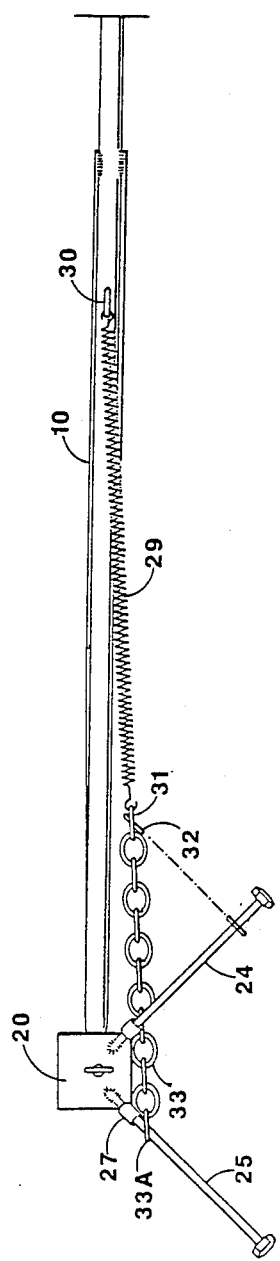
FIG. 3 is a top plan view similar to FIG. 2 showing the gate in an opened position.

A gate structure comprises an elongate tubular member 10 which in the assembled condition extends generally horizontal and which is pinched slightly at an inner end indicated at 11 for welding to a vertical tube 12 of the same diameter. A cross strut 13 extends from the bottom of the vertical tube 12 to a position part way along the horizontal tube 10 with the cross strut being formed as a channel member so it can be simply welded around the tubes 10 and 12. A further piece of the channel member is wrapped around the tube 10 as indicated at 14 to provide further support for the tube at the inner end adjacent the hinge where the majority of the forces are encountered.

The length of the tube 10 may be of the order of 10 feet and there is provided an extension piece 15 in the form of an elongate rod of smaller diameter than the tube so that it can slide within the tube from a fully retracted position in which only a small part of the rod is exposed to an extended position in which length of the order of 7 to 8 feet of the rod is exposed to increase the effective length of the gate. In order to maintain the rod 15 as a friction fit within the tube 10, the tube 10 is pinched as indicated at 16 along a portion of the length of the tube on the underside thereof so as to define at the end a tube of just sufficient diameter to receive the rod 15 as a friction fit.

The gate structure including the tube 10 is formed of a suitable metal material so as to communicate the electric current from electric shock system along the length of the tube 10 for engaging an animal in contact with the gate structure in conventional manner. The rod 15 is formed from a glass fibre reinforce resin material by pultrusion with wires 17 embedded in the protruding material and wrapped around the outer surface with the wires being arranged at the surface so that they can receive and communicate the electric current from the shock system.

The tube 12 receives a pin 18 therein so the said gate structure can be pivoted about the vertical axis of the pin 18. The pin is carried in a C-shaped bracket 19 with upper flange 20 and lower flange 21 each of which extends horizontally from a back plate 22 which can suitably bolted or attached to a fence post. The pin thus is received in the flanges 20 and 21 with an upper ring 23 forming part of the pin 18 and a suitable attachment for the electric shock system.

On the upper surface of the upper flange 20 is welded a pair of pins 24 and 25 so they extend outwardly from the upper surface to either side of the intended closed position of the gate structure. Each of the pins includes a shank and a head 26 and in a convenient construction the pins are formed from lag bolts with the nuts of the bolts screwed into place and the nuts welded to the upper surface of the upper flange 20. A collar 27 is positioned on the pin adjacent the nut to restrict the free area of the pin.

As shown in FIG. 2, the pins 24 and 25 extend outwardly to the sides of the upper flange 20 at angle indicated at 28 of the order of 50° to the gate structure when standing in the closed position thereof. Thus the pins extend outwardly to the sides and forwardly from the axis of pivotal movement of the gate structure defined by the pin 18. As shown also in FIG. 1, the pins 24 and 25 extend slightly upwardly in an angle of the order of 10° or 15° so that the head of the pin lies in a horizontal plane slightly higher than the base of the pin adjacent to collar 27.

A spring coupling extends between each of the pins 24 and 25 and the gate structure so as to tend to bias the gate structure to the closed position as shown in FIG. 2. The spring coupling comprises a single spring 29 which has one end attached to a loop 30 at a position on the gate structure forwardly of the hinge and adjacent the end of the reinforcing channel 14. At the other end of the single spring 29 is mounted a chain link 31 which is coupled to two separate chains 32 and 33 each of which extends to a respective one of the pins 24 and 25. Thus the spring coupling between the pin 24 and the gate is defined by the chain 32 and the spring 29 and the spring coupling between the pin 25 and the gate is defined by the chain 33 and the spring 29.

In a closed position of the gate shown in FIG. 2, the spring 29 extends longitudinally along the gate and is arranged under slight tension so as to hold the gate in that position since any movement about the vertical pivot axis of the gate from the closed condition will tend to tighten one of the chains 32 and loosen the other chain so that the spring is moved to one side of the gate and stretched thus tending to return the gate to the central position.

When it is required for the gate to be opened, the gate can be merely engaged from one side and pushed against the spring bias applied by the spring coupling. Thus, for example, as the gate is moved in a clock-wise direction about the pin 18, the chain 32 merely falls loose as the distance between the loop 30 and the head of the pin 24 is decreased while the spring coupling defined by the chain 33 and the spring 29 is tensioned as the distance between the head of the pin 25 and the loop 30 gradually increases. As this distance increases, the spring force applied by the spring 29 increases thus increasing the spring bias restoring the gate to the closed position. As we have seen in FIG. 2, the chain 33 lies at an angle to the pin 25 of slightly greater than 90° so that the link at the end of the chain wrapped around the pin 25 is free to slide on the pin toward the head 26. As the gate is opened, however, the angle between the chain 33 and the pin 25 gradually reduces until it passes 90° whereupon there is a force tending to slide the chain and its end most link indicated at 33A in a direction along the pin towards the axis of the pin 18. This position is shown in FIG. 3 where the link 33A of the chain 33 has moved along the pin 25 up to the collar 27 where is it held against further movement. This movement of the link 33A has moved the point of engagement between the chain 33 and the support structure defined by the pin 25 from a position outwardly of the axis to a position closer to the axis thus reducing the mechanical advantage of the spring relative to the gate structure. Thus the gate structure can be moved yet further open without significantly increasing the spring force applied to the gate structure since the mechanical advantage is significantly reduced by the closed position of the link 33A to the axis.

It will also be noted that because the pins are inclined slightly upwardly as the link 33A moves inwardly along the pin 25 it also moves downwardly toward the upper surface 20 so the chain 33 in the tight condition extends clearly under the pin without interfering with that pin.

To assist in maintaining the gate in the center position, there is provided a wire loop latch 40 having ends 41 welded on to the box plate 21 and a spring recess 42 at an outer position thereof between two raised portions 43 which act to confine the frame 13 in the recess 42. The wire loop can flex to allow the gate to escape over the raised areas 43 for opening and to allow the gate back to the latched central position.

When the gate is released, the spring force applied by the chain 33 and the spring 29 remains sufficient to pull the gate back toward the closed position but that spring force is not so great as to cause a wild swinging action of the gate structure around the pivot axis. As the gate again approaches the closed position, the changing angle of the chain 33 relative to the pin 25 beyond the 90° angle causes the link 33 to slide outwardly along the pin to regain the position shown in FIG. 2.

Since various midifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A self-centering stock-proof gate comprising a gate structure for extending outwardly from a post, a support structure including mounting means for mounting on the post, hinge means for supporting the gate structure on said mounting means for pivotal movement about a vertical axis at said mounting means such that the gate structure is movable from a closed position to each of two open positions each substantially at right angles to the closed position first and second slide members each mounted on said support structure so as to extend from said axis in a direction along the gate structure in the closed position thereof and outwardly to a respective side of said gate structure in the closed position thereof, first and second elongate flexible coupling means each having a first end and a second end arranged to apply a spring biasing force to said gate structure from a respective one of said open position toward said closed position, each said slide member being arranged to receive said first end of said respective spring coupling means for sliding movement of said first end from a position outwardly of said axis to a position adjacent to said axis, the orientation of the slide member and the connection between the spring coupling means and the gate structure being arranged such that in the closed position said first end of each of said spring coupling means is positioned at said outward position thereof and as said gate moves toward a respective one of the open positions, said first end of a respective one of said spring coupling means slides toward said adjacent position thereof.

2. The invention according to claim 1 wherein the slide member comprises a pin and wherein said first end includes a loop member wrapped around the pin and freely slidable there along.

3. The invention according to claim 2 wherein in each spring coupling means comprises a chain with one link of the chain defining said loop wrapped around said pin.

4. The invention according to claim 1 wherein said first and second spring coupling means include a common single spring member having one end connected to the gate structure and an opposed end connected to each of said spring coupling means.

5. The invention according to claim 1 wherein each of said slide member also is inclined in a vertical direction such that said first end of the respective spring coupling means moves vertically as it moves inwardly towards said axis whereby the respective spring coupling means avoids contacting the other of said slide member when moved to said open position.

6. The invention according to claim 1 wherein said support structure comprises a C-shaped hinge member defining an upper horizontal flange and a lower horizontal flange interconnected by a vertical back plate member, wherein said gate structure includes a vertical tube member pivotally mounted between said upper and lower flanges and an elongate bar member extending outwardly from said vertical tube member and wherein said slide members comprise a pair of pin members each mounted on and extending outwardly from an outer surface of one of said flanges.

7. The invention according to claim 1 wherein said gate structure comprises substantially a single horizontal bar extending outwardly from said hinge means and means for communicating electrical supply to said bar for providing electric shock to animals contacting the bar.

8. The invention according to claim 7 wherein said bar comprises an elongate tube and an extension piece in the form of a shaft slideable within the tube so as to move from a retracted position substantially wholly within the tube to an extended position extending outwardly from an open end of the tube remote from said hinge means.

9. The invention according to claim 8 wherein said extension piece comprises a fibre reinforced plastic rod having an electrically conductive wire embedded in the surface thereof.

* * * * *